US012597189B2

(12) United States Patent
Shah et al.

(10) Patent No.: US 12,597,189 B2
(45) Date of Patent: Apr. 7, 2026

(54) METHODS AND APPARATUS FOR SYNTHETIC COMPUTED TOMOGRAPHY IMAGE GENERATION

(71) Applicant: Siemens Medical Solutions USA, Inc., Malvern, PA (US)

(72) Inventors: Vijay Shah, Knoxville, TN (US); Lauren Partin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 413 days.

(21) Appl. No.: 18/327,241

(22) Filed: Jun. 1, 2023

(65) Prior Publication Data

US 2024/0404128 A1      Dec. 5, 2024

(51) Int. Cl.
*G06T 12/10* (2026.01)
*G06F 40/20* (2020.01)
(Continued)

(52) U.S. Cl.
CPC .............. *G06T 12/10* (2026.01); *G06F 40/20* (2020.01); *G06T 7/0012* (2013.01); *G06T 7/11* (2017.01); *G06T 2207/10081* (2013.01); *G06T 2207/10104* (2013.01); *G06T 2207/10108* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS 9,600,910 B2    3/2017  Wang et al.
10,943,349 B2   3/2021  Lee et al.
(Continued)

FOREIGN PATENT DOCUMENTS

WO       2022/056508       3/2022

OTHER PUBLICATIONS

Serdar Charyyev, et al., "Learning-based synthetic dual energy CT imaging from single energy CT for stopping power ratio calculation in proton radiation therapy," BJR, vol. 95, Issue 1129, Jan. 1, 2022.
(Continued)

*Primary Examiner* — Nancy Bitar

(57) ABSTRACT

Systems and methods for generating attenuation maps for reconstructing medical images are disclosed. In some examples, measurement data, such as positron emission tomography (PET) data or single-photon emission computed tomography (SPECT) data, is received for a subject. A machine learning process is applied to the measurement data to generate initial synthetic images for multiple values of an imaging parameter. Further, patient data is received and classified to determine an object imaged with the subject. A second medical image is selected that includes the object, and a region-of-interest (ROI) of the initial synthetic images is determined. Further, based on the ROI an anatomical mask is generated for each initial synthetic image. A second image-to-image network process is applied to the patient data, the second medical image, a portion of each initial synthetic image that includes the ROI, and the corresponding anatomical mask to generate a final synthetic image.

20 Claims, 7 Drawing Sheets

(51) Int. Cl.
    *G06T 7/00*       (2017.01)
    *G06T 7/11*       (2017.01)

(56)            References Cited

U.S. PATENT DOCUMENTS

| | | | |
|---|---|---|---|
| 11,475,535 B2 | 10/2022 | Piat et al. | |
| 2019/0130569 A1 | 5/2019 | Liu et al. | |
| 2021/0056734 A1* | 2/2021 | Han | A61N 5/1039 |
| 2022/0207791 A1* | 6/2022 | Shi | G06N 3/088 |
| 2022/0346742 A1 | 11/2022 | Teixeira et al. | |
| 2023/0009528 A1 | 1/2023 | Schaefferkoetter | |
| 2024/0298990 A1* | 9/2024 | Siversson | A61N 5/1039 |

OTHER PUBLICATIONS

Uirui Liu, et al., "Synthetic dual-energy CT for MRI-only based proton therapy treatment planning using label-GAN," Physics in Medicine & Biology, Mar. 9, 2021; vol. 66, No. 6, 065014. doi: 10.1088/1361-6560/abe736. PMID: 33596558.

* cited by examiner

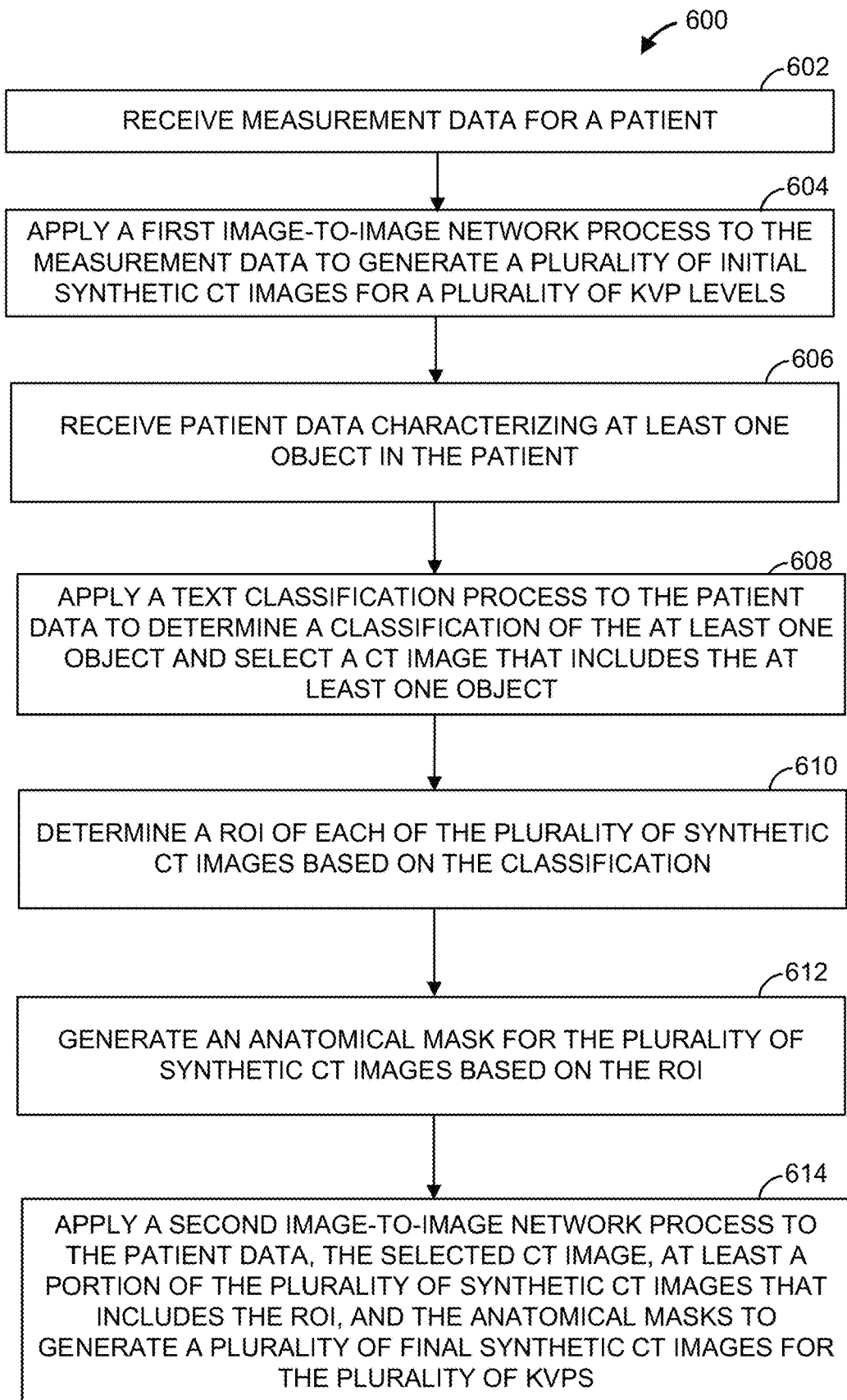

600

602

RECEIVE MEASUREMENT DATA FOR A PATIENT

604

APPLY A FIRST IMAGE-TO-IMAGE NETWORK PROCESS TO THE MEASUREMENT DATA TO GENERATE A PLURALITY OF INITIAL SYNTHETIC CT IMAGES FOR A PLURALITY OF KVP LEVELS

606

RECEIVE PATIENT DATA CHARACTERIZING AT LEAST ONE OBJECT IN THE PATIENT

608

APPLY A TEXT CLASSIFICATION PROCESS TO THE PATIENT DATA TO DETERMINE A CLASSIFICATION OF THE AT LEAST ONE OBJECT AND SELECT A CT IMAGE THAT INCLUDES THE AT LEAST ONE OBJECT

610

DETERMINE A ROI OF EACH OF THE PLURALITY OF SYNTHETIC CT IMAGES BASED ON THE CLASSIFICATION

612

GENERATE AN ANATOMICAL MASK FOR THE PLURALITY OF SYNTHETIC CT IMAGES BASED ON THE ROI

614

APPLY A SECOND IMAGE-TO-IMAGE NETWORK PROCESS TO THE PATIENT DATA, THE SELECTED CT IMAGE, AT LEAST A PORTION OF THE PLURALITY OF SYNTHETIC CT IMAGES THAT INCLUDES THE ROI, AND THE ANATOMICAL MASKS TO GENERATE A PLURALITY OF FINAL SYNTHETIC CT IMAGES FOR THE PLURALITY OF KVPS

FIG. 6

METHODS AND APPARATUS FOR SYNTHETIC COMPUTED TOMOGRAPHY IMAGE GENERATION

FIELD

Aspects of the present disclosure relate in general to medical diagnostic systems and, more particularly, to generating synthetic computed tomography images for attenuation correction of nuclear images.

BACKGROUND

Nuclear imaging systems can employ various technologies to capture images. For example, some nuclear imaging systems employ positron emission tomography (PET) to capture images. PET is a nuclear medicine imaging technique that produces tomographic images representing the distribution of positron emitting isotopes within a body. As another example, some nuclear imaging systems capture images using single-photon emission computed tomography (SPECT). SPECT produces a 3-dimensional image of a distribution of a radioactive tracer that is injected into a person's bloodstream and subsequently absorbed by certain tissue. Some nuclear imaging systems employ computed tomography (CT), for example, as a co-modality. CT is an imaging technique that uses x-rays to produce anatomical images. Magnetic Resonance Imaging (MRI) is an imaging technique that uses magnetic fields and radio waves to generate anatomical and functional images. Some nuclear imaging systems combine images from PET or SPECT and CT scanners during an image fusion process to produce images that show information from both a PET or SPECT scan and a CT scan (e.g., PET/CT systems, SPECT CT). Similarly, some nuclear imaging systems combine images from PET or SPECT and MRI scanners to produce images that show information from both a PET or SPECT scan and an MRI scan.

Typically, these nuclear imaging systems capture measurement data, and process the captured measurement data using mathematical algorithms to reconstruct medical images. In some instances, the systems generate attenuation maps for attenuation and scatter correction. For example, the systems may generate the attenuation maps based on a single energy CT image using a mapping algorithm. In some examples, in the absence of CT images, a system may generate attenuation maps based on deep learning models. The systems may then generate a final reconstructed medical image based on the captured measurement data and the attenuation map. These attenuation corrections processes, however, can suffer from drawbacks. For example, systems may fail to generate attenuation maps that provide accurate corrections when high density material, such as implants and devices, are imaged. In some systems, such as dual-energy CT (DECT) systems, higher radiation doses are needed to generate more accurate attenuation maps. Furthermore, inter-scan motion and image artifacts (e.g., truncation, distortion) can cause the generation of inaccurate attenuation maps. As such, there are opportunities to address the generation of attenuation correction processes in nuclear imaging systems.

SUMMARY

Systems and methods for generating synthetic computed tomography (CT) images of multiple energies to generate attenuation maps (e.g., predicted attenuation maps) for the reconstruction of medical images are disclosed.

In some embodiments, a computer-implemented method includes receiving measurement data for a patient from an image scanning system. The method also includes applying a first image-to-image network process to the measurement data to generate a plurality of initial synthetic images for a plurality of values of an imaging parameter. The method further includes determining a region-of-interest (ROI) of the plurality of initial synthetic images based on patient data characterizing at least one object. The method also includes generating an anatomical mask corresponding to each of the plurality of initial synthetic images based on the ROI. Further, the method includes applying a second image-to-image network process to the patient data, at least a portion of the plurality of initial synthetic images that includes the ROI, and the anatomical masks to generate a plurality of final synthetic images. The method also includes storing the plurality of final synthetic images in a data repository.

In some embodiments, a non-transitory computer readable medium stores instructions that, when executed by at least one processor, cause the at least one processor to perform operations including receiving measurement data for a patient from an image scanning system. The operations also include applying a first image-to-image network process to the measurement data to generate a plurality of initial synthetic images for a plurality of values of an imaging parameter. The operations further include determining a region-of-interest (ROI) of the plurality of initial synthetic images based on patient data characterizing at least one object. The operations also include generating an anatomical mask corresponding to each of the plurality of initial synthetic images based on the ROI. Further, the operations include applying a second image-to-image network process to the patient data, at least a portion of the plurality of initial synthetic images that includes the ROI, and the anatomical masks to generate a plurality of final synthetic images. The operations also include storing the plurality of final synthetic images in a data repository.

In some embodiments, a system includes a memory device storing instructions and at least one processor communicatively coupled the memory device. The at least one processor is configured to execute the instructions to receive measurement data for a patient from an image scanning system. The at least one processor is also configured to execute the instructions to apply a first image-to-image network process to the measurement data to generate a plurality of initial synthetic images for a plurality of values of an imaging parameter. The at least one processor is further configured to execute the instructions to determine a region-of-interest (ROI) of the plurality of initial synthetic images based on patient data characterizing at least one object. The at least one processor is also configured to execute the instructions to generate an anatomical mask corresponding to each of the plurality of initial synthetic images based on the ROI. Further, the at least one processor is configured to execute the instructions to apply a second image-to-image network process to the patient data, at least a portion of the plurality of initial synthetic images that includes the ROI, and the anatomical masks to generate a plurality of final synthetic images. The at least one processor is also configured to execute the instructions to store the plurality of final synthetic images in a data repository.

In some embodiments, an apparatus includes a means for receiving measurement data for a patient from an image scanning system. The apparatus also includes a means for applying a first image-to-image network process to the measurement data to generate a plurality of initial synthetic images for a plurality of values of an imaging parameter. The apparatus further includes a means for determining a region-of-interest (ROI) of the plurality of initial synthetic images based on patient data characterizing at least one object. The apparatus also includes a means for generating an anatomical mask corresponding to each of the plurality of initial synthetic images based on the ROI. Further, the apparatus includes a means for applying a second image-to-image network process to the patient data, at least a portion of the plurality of initial synthetic images that includes the ROI, and the anatomical masks to generate a plurality of final synthetic images. The apparatus also includes a means for storing the plurality of final synthetic images in a data repository.

BRIEF DESCRIPTION OF THE DRAWINGS

The following will be apparent from elements of the figures, which are provided for illustrative purposes and are not necessarily drawn to scale.

FIG. 6 is a flowchart of an example method to generate synthetic images, in accordance with some embodiments.

DETAILED DESCRIPTION

Figure 1:
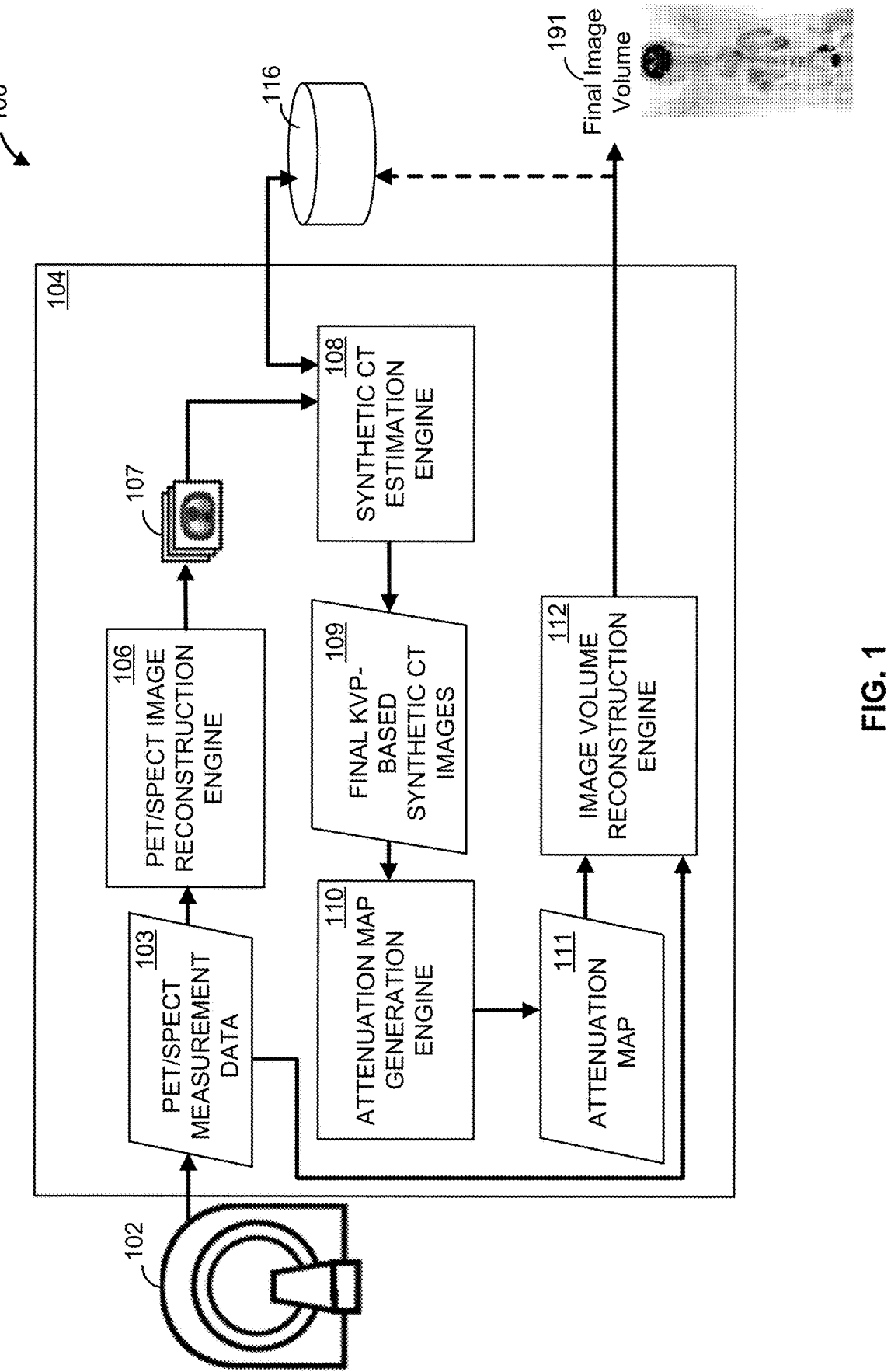
FIG. 1 illustrates an example of a nuclear image reconstruction system, in accordance with some embodiments.

This description of the exemplary embodiments is intended to be read in connection with the accompanying drawings, which are to be considered part of the entire written description.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system.

Furthermore, claims for methods and systems for training image reconstruction functions can be improved with features described or claimed in context of the methods and systems for image reconstruction, and vice versa. In other words, claims for methods and systems for training image reconstruction functions can be improved with features described or claimed in context of the methods and systems for image reconstruction, and vice versa. In particular, the trained image-to-image network functions of the methods and systems for generating synthetic images, such as synthetic CT images, and reconstructing images can be adapted by the methods and systems for training the image-to-image network functions. Furthermore, the input data to the trained image-to-image network functions can comprise advantageous features and embodiments of the training input data, and vice versa. Likewise, the output data of the trained image-to-image network functions can comprise advantageous features and embodiments of the output training data, and vice versa.

Various embodiments of the present disclosure can employ machine learning methods or processes to reconstruct images based on measurement data received from nuclear imaging systems. For example, the embodiments can employ machine learning processes to generate synthetic images for one or more values of an imaging parameter. As known in the art, a synthetic image is an image generated synthetically rather than through a corresponding imaging means. For instance, a synthetic CT image may be a CT image generated from an MR image rather than through a CT scanner. Further, an imaging parameter may be, for example, a kilovoltage peak (kVp) level of the imaging beam, an imaging filter (e.g., aluminum filter, a tin filter, an aluminum-tin filter), an imaging filter size (e.g., filter thickness), or any other imaging parameter. The embodiments can also employ machine learning processes to determine an attenuation map based on the generated synthetic images for image reconstruction. The generated synthetic images may be, for instance, synthetic CT images, synthetic magnetic resonance (MR) images, or any other any images from which attenuation maps can be derived. In some embodiments, machine learning methods or processes are trained to improve the generation of synthetic images and the reconstruction of images.

Nuclear imaging technologies, such as PET and SPECT, generally require an attenuation map to correct for a number of photons that have either been lost for a sinogram bin (i.e., attenuation correction) or wrongly assigned to another sinogram bin (i.e., scatter correction).

In some embodiments, initial synthetic images, such as synthetic CT images, for multiple imaging parameter values are generated based on measurement data (e.g., PET measurement data, SPECT measurement data) received for a subject (e.g., patient). For instance, a trained image-to-image network process (e.g., a trained deep learning process, a trained neural network process, a trained encoding and decoding process, a trained diffusion model process) may be applied to the measurement data from a PET imaging modality or a SPECT imaging modality to generate the initial synthetic images for multiple values of one or more imaging parameters. In some instances the initial synthetic images are generated based on the measurement data and a partial image or optical image of the subject (e.g., a partial SECT image).

Further, a text classification process may be applied to patient data characterizing one or more objects (e.g., objects captured within a field-of-view of an imaging device, objects within the subject) to select a CT image of a scanned object. For instance, the patient data may include textual data such as "implants in left hip using Brand A porous metal." The text classification process may classify the patient data (e.g., as a "left hip metal implant") and, based on the classification, may select one of a plurality of CT images that includes the scanned object (e.g., the CT image that includes a metal implant in a left hip).

Based on the classification of the patient data, a region of interest (ROI) of the initial synthetic images may be determined. For instance, the ROI may define an area of the left hip that includes the metal implant. Further, a portion of each of the initial synthetic images are determined based on the ROI. For example, each of the initial synthetic images may be cropped based on the ROI. In addition, an anatomical mask is generated for each of the initial synthetic images. As known in the art, an anatomical mask, such as an image segmentation mask, may be a digital representation of one or more structures (e.g., features) captured by an image, and may define one or more structure attributes (e.g., surface contours, edges, boundaries) of the structures (e.g., by corresponding pixel values). For instance, the anatomical mask may define a location of the structures within the image.

Further, a final synthetic image is generated for each initial synthetic image. For instance, a trained image-to-image network process (e.g., a trained deep learning process, a trained encoding and decoding process, a trained neural network process, a trained diffusion model process) may be applied to the selected CT image, the portion of each initial synthetic image, and the corresponding anatomical mask to generate a final synthetic image. The anatomical mask constrains the trained image-to-image network process to a relevant region of each portion of each initial synthetic image.

An initial attenuation map may then be generated for each final synthetic image. For example, a trained neural network process (e.g., a deep convolutional neural network process) may be applied to each final synthetic image to generate a corresponding initial attenuation map. Further, one or more metrics may be calculated based on the initial attenuation maps. For instance, a mean and/or a coefficient of variation (CV) may be calculated based on values of the initial attenuation maps. In some instances, a mean and CV is generated for each corresponding pixel of the initial attenuation maps.

Based on the one or more metrics, a determination may be made as to whether to reconstruct a final image (e.g., a 3D image volume). For example, a determination may be made as to whether the one or more computed metrics exceed a corresponding threshold. If, for instance, one or more of the metrics exceed their corresponding threshold, (e.g., the calculated coefficient of variation is above a threshold), the subject may be scanned again (i.e., assuming the subject has consented). Otherwise, if the one or more metrics do not exceed their corresponding threshold, a final attenuation map is generated based on the initial attenuation maps. For example, the final attenuation map may be generated based on a mean of the initial attenuation maps (e.g., the calculated mean value for each corresponding pixel of the initial attenuation maps). The final attenuation map may then be used to correct the measurement data received for the subject to reconstruct the final image.

FIG. 1 illustrates one embodiment of a nuclear imaging system 100. As illustrated, nuclear imaging system 100 includes image scanning system 102, image reconstruction system 104, and one or more data repositories 116. Image scanning system 102, in this example, can be a nuclear image scanner such as, for instance, a PET scanner (i.e., PET imaging modality) or a SPECT scanner (i.e., SPECT imaging modality). Image scanning system 102 can scan a subject (e.g., a person) and, based on the scan, generate PET/SPECT measurement data 103 (also referred to herein as measurement data 103). The measurement data 103 may be, for example, PET or SPECT raw data, such as sinogram data. For instance, the measurement data 103 may be generated at multiple peak potential levels (e.g., kVp levels), and/or using various filter sizes for an imaging filter, or for differing values of any combination of these or other imaging parameters. The measurement data 103 can represent anything imaged in the scanner's field-of-view (FOV) containing, for a PET scanner, positron emitting isotopes, and for a SPECT scanner, gamma rays. For example, the measurement data 103 can represent whole-body image scans, such as image scans from a patient's head to the patient's thigh. Image scanning system 102 can transmit the measurement data 103 to image reconstruction system 104.

As illustrated, image reconstruction system 104 includes PET/SPECT image reconstruction engine 106, synthetic CT estimation engine 108, attenuation map generation engine 110, and image volume reconstruction engine 112. PET/SPECT image reconstruction engine 106 receives and processes the measurement data 103 to generate a PET/SPECT reconstructed image 107. For instance, in the example of PET, PET image reconstruction engine 106 may operate on PET measurement data 103 using any process method known in the art to generate a PET reconstructed image 107. Similarly, in the example of SPECT, SPECT image reconstruction engine 106 may operate on SPECT measurement data 103 using any suitable process known in the art to generate a SPECT reconstructed image 107.

Further, synthetic CT estimation engine 108 receives reconstructed image 107, and applies one or more machine learning processes, such as the image-to-image network processes described herein, to the reconstructed image 107 to generate a final KVP-based synthetic CT image 109 for each value of an imaging parameter (or, in some examples, for each combination of values of multiple imaging parameters). For example, CT estimation engine 108 may generate features based on the reconstructed image 107, and may input the generated features to a trained image-to-image network process, such as a trained neural network process, to generate initial synthetic CT images for each of a multiple of peak potential levels (e.g., initial kVp-based synthetic CT images). For instance, the trained image-to-image network process may generate a first initial synthetic CT image for an 80 kVp level, a second initial synthetic CT image for a 90 kVp level, a third initial synthetic CT image for a 100 kVp level, and a fourth initial synthetic CT image for a 110 kVp level. The trained image-to-image network process may further generate a fifth initial synthetic CT image for a 120 kVp level, a sixth initial synthetic CT image for a 130 kVp level, and a seventh initial synthetic CT image for a 140 kVp level.

Although seven initial synthetic CT images at corresponding peak potential levels are described in this example, in other examples, the number of synthetic CT images generated at various levels may be less than, or greater than, seven. In addition, although in this example the peak potential levels corresponding to the initial synthetic CT images are distributed between a range of 80 and 140 kVp levels, inclusively, at 10 kVp increments, in other examples, the peak potential levels corresponding to the initial synthetic CT images may be distributed across a different range of peak potential levels, and with a different increment amount. In some instances, the increment amount between the peak potential levels may vary. For instance, the trained image-to-image network process may generate a first initial synthetic CT image for an 80 kVp level, a second initial synthetic CT image for a 90 kVp level, and a third initial synthetic CT image for a 120 kVp level.

The image-to-image network process can be trained based on features generated from previously generated PET images or SPECT images (e.g., ground truth data) during a training period. For instance, the image-to-image network process may be trained based on previously generated synthetic CT images generated at various peak potential levels. Further, the neural network process can be validated during a validation period, such as by comparing generated initial synthetic CT images to expected initial synthetic CT images.

In some instances, CT estimation engine 108 receives, from data repository 116, a partial CT image of the subject (e.g., a CT image of the subject's hip), and applies the trained image-to-image network process to the reconstructed image 107 and the partial CT image to generate the initial synthetic CT images for multiple imaging parameter values. For example, CT estimation engine 108 may generate features based on the reconstructed image 107 and the partial CT image of the subject, and may input the generated features to the trained image-to-image network process to generate the initial synthetic CT images. In other instances, CT estimation engine 108 receives, from data repository 116, an optical image of the subject (e.g., a partial optical image of the subject's hip), and applies the trained image-to-image network process to the reconstructed image 107 and the partial optical image to generate the initial synthetic CT images for multiple imaging parameter values. For example, CT estimation engine 108 may generate features based on the reconstructed image 107 and the optical image of the subject, and may input the generated features to the trained image-to-image network process to generate the initial synthetic CT images. In any of these instances, the neural network process may be trained on previously generated initial synthetic CT images, as well as previously generated partial CT images or optical images.

Further, CT estimation engine 108 may receive, from data repository 116, patient data characterizing one or more objects that were scanned with the subject. For example, the patient data may include natural language (e.g., textual data) describing an object that was within a field-of-view of a scanner of an imaging device that scanned the subject. The object may be, for instance, a foreign object within an organ of the subject that was scanned. CT estimation engine 108 may apply a trained text classification process to the patient data to generate classification data that classifies the described object and, in some examples, a location of the object. For instance, the object may be classified as a "left hip metal implant," a "metal implant," a "pacemaker," a "screw," or a "head holder" used to hold a patient's head when the patient is being scanned by an imaging device.

Further, CT estimation engine 108 may select a CT image of the object based on the classification. For example, data repository 116 may store a plurality of CT images, where each CT image is of an object (e.g., a foreign object embedded within a person). For instance, a first CT image may be of a first object (e.g., metal implant), a second CT image may be of a second object (e.g., a pace maker), and a third CT image may be of a third object (e.g., a screw). In some examples, the CT images may include CT images of a same object at different positions or angles. The CT images may, in some examples, be labelled (e.g., within metadata) with the corresponding object. Based on the classification, CT estimation engine 108 may select a CT image of the object. For instance, CT estimation engine 108 may compare the classification of the patient data to the labels of the CT images to identify and select a matching CT image.

Based on the classification of the patient data (e.g., the classification data), CT estimation engine 108 may determine a region of interest (ROI) of each of the generated initial synthetic CT images. For instance, CT estimation engine 108 may apply an anatomical segmented model (e.g., algorithm) to the classification of the patient data to determine the ROI. As described herein, the ROI may define an area of the subject that includes the object. Further, CT estimation engine 108 may determine a portion of each of the initial synthetic CT images based on the ROI. For example, CT estimation engine 108 may "crop" each initial synthetic CT image based on the ROI such that each portion of each of the initial synthetic CT images includes portions of the initial synthetic CT image inside the ROI, and does not include portions of the initial synthetic CT image outside the ROI.

Further, CT estimation engine 108 may generate an anatomical mask for each of the portions of the initial synthetic CT images based on the ROI (e.g., an anatomical mask is generated for each cropped initial synthetic CT image). For instance, CT estimation engine 108 may compute, from each initial synthetic CT image, a corresponding anatomical mask. CT estimation engine 108 may then crop the anatomical mask based on the determined ROI. For instance, CT estimation engine 108 may "zero out" (e.g., replace with zero values) those portions of the uncropped anatomical mask that are outside the ROI.

CT estimation engine 108 may additionally perform operations to generate, for each of the initial synthetic CT images, a final KVP-based synthetic CT image 109. For example, CT estimation engine 108 may apply a trained image-to-image network process, such as a trained neural network process, to the selected CT image, an initial synthetic CT image (e.g., the cropped initial synthetic CT image), and the corresponding anatomical mask to generate the final KVP-based synthetic CT image 109. CT estimation engine 108 may generate a final KVP-based synthetic CT image 109 for each of the initial synthetic CT images.

The image-to-image network process can be trained based on features generated from previously selected CT images, initial synthetic CT images, and corresponding anatomical masks (e.g., ground truth data) during a training period. Further, the image-to-image network process can be validated during a validation period, such as by comparing generated final synthetic CT images to expected final synthetic CT images.

Attenuation map generation engine 110 may receive the final KVP-based synthetic CT images 109, and may generate an attenuation map 111 for each of the final KVP-based synthetic CT images 109. For example, attenuation map generation engine 110 may apply a trained neural network process, such as a deep convolutional neural network process, to each final KVP-based synthetic CT images 109 to generate a corresponding initial attenuation map. Further, attenuation map generation engine 110 may determine a final attenuation map 111 based on the initial attenuation maps. For instance, attenuation map generation engine 110 may determine mean values of corresponding pixels of the initial attenuation maps, and may generate attenuation map 111 based on the computed mean values.

Image volume reconstruction engine 112 may perform processes to correct the measurement data 103 based on the attenuation map 111. For example, image volume reconstruction engine 112 may receive the attenuation map 111 and the measurement data 103, and may perform processes to adjust the measurement data 103 based on the attenuation map 111 to generate the final image volume 191. For instance, image volume reconstruction engine 112 may apply an Ordered Subsets Expectation-Maximization (optionally with time-of-flight and/or point spread function) or Filtered BackProjection process to adjust the measurement data 103 based on the attenuation map 111. Final image volume 191 can include image data that can be provided for display and analysis, for example. In some examples, image volume reconstruction engine 112 stores the final image volume 191 in data repository 116.

In some examples, all or parts of image reconstruction system 104, including one or more of PET/SPECT image reconstruction engine 106, synthetic CT estimation engine 108, attenuation map generation engine 110, and image volume reconstruction engine 112, are implemented in hardware, such as in one or more field-programmable gate arrays (FPGAs), one or more application-specific integrated circuits (ASICs), one or more state machines, one or more computing devices, digital circuitry, or any other suitable circuitry. In some examples, parts or all of image reconstruction system 104 can be implemented in software as executable instructions such that, when executed by one or more processors, cause the one or more processors to perform respective functions as described herein. The instructions can be stored in a non-transitory, computer-readable storage medium, for example.

Figure 3:
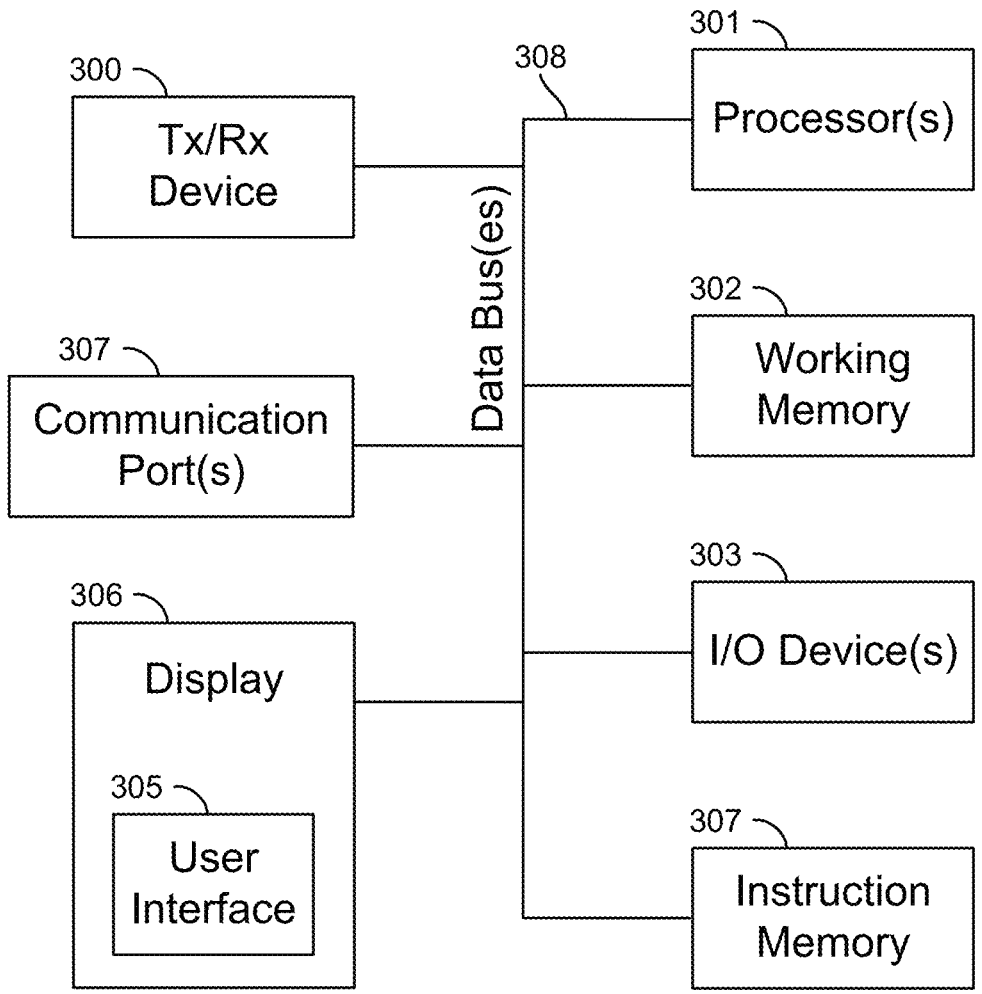
FIG. 3 illustrates a block diagram of an example computing device that can perform one or more of the functions described herein, in accordance with some embodiments.

For example, FIG. 3 illustrates a computing device 300 that can be employed by the image reconstruction system 104. Computing device 300 can implement, for example, one or more of the functions of image reconstruction system 104 described herein.

Computing device 300 can include one or more processors 301, working memory 302, one or more input/output devices 303, instruction memory 307, a transceiver 304, one or more communication ports 307, and a display 306, all operatively coupled to one or more data buses 308. Data buses 308 allow for communication among the various devices. Data buses 308 can include wired, or wireless, communication channels.

Processors 301 can include one or more distinct processors, each having one or more cores. Each of the distinct processors can have the same or different structure. Processors 301 can include one or more central processing units (CPUs), one or more graphics processing units (GPUs), application specific integrated circuits (ASICs), digital signal processors (DSPs), and the like.

Processors 301 can be configured to perform a certain function or operation by executing code, stored on instruction memory 307, embodying the function or operation. For example, processors 301 can be configured to perform one or more of any function, method, or operation disclosed herein.

Instruction memory 307 can store instructions that can be accessed (e.g., read) and executed by processors 301. For example, instruction memory 307 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 307 can store instructions that, when executed by one or more processors 301, cause one or more processors 301 to perform one or more of the functions of image reconstruction system 104, such as one or more of the PET/SPECT image reconstruction engine 106 functions, one or more of the synthetic CT estimation engine 108 functions, one or more of the attenuation map generation engine 110 functions, or one or more of the image volume reconstruction engine 112 functions.

Processors 301 can store data to, and read data from, working memory 302. For example, processors 301 can store a working set of instructions to working memory 302, such as instructions loaded from instruction memory 307. Processors 301 can also use working memory 302 to store dynamic data created during the operation of computing device 300. Working memory 302 can be a random access memory (RAM) such as a static random access memory (SRAM) or dynamic random access memory (DRAM), or any other suitable memory.

Input/output devices 303 can include any suitable device that allows for data input or output. For example, input/output devices 303 can include one or more of a keyboard, a touchpad, a mouse, a stylus, a touchscreen, a physical button, a speaker, a microphone, or any other suitable input or output device.

Communication port(s) 307 can include, for example, a serial port such as a universal asynchronous receiver/transmitter (UART) connection, a Universal Serial Bus (USB) connection, or any other suitable communication port or connection. In some examples, communication port(s) 307 allows for the programming of executable instructions into instruction memory 307. In some examples, communication port(s) 307 allow for the transfer (e.g., uploading or downloading) of data, such as of the downloading of final image volumes 191.

Display 306 can display user interface 305. User interfaces 305 can enable user interaction with computing device 300. For example, user interface 305 can be a user interface for an application that allows for the viewing of final image volume 191. In some examples, a user can interact with user interface 305 by engaging an input/output device 303. In some examples, display 306 can be a touchscreen, where user interface 305 is displayed on the touchscreen.

Transceiver 304 allows for communication with a network, such as a Wi-Fi network, an Ethernet network, a cellular network, or any other suitable communication network. For example, if operating in a cellular network, transceiver 304 is configured to allow communications with the cellular network. One or more processors 301 are operable to receive data from, or send data to, a network via transceiver 304.

Figure 2A:
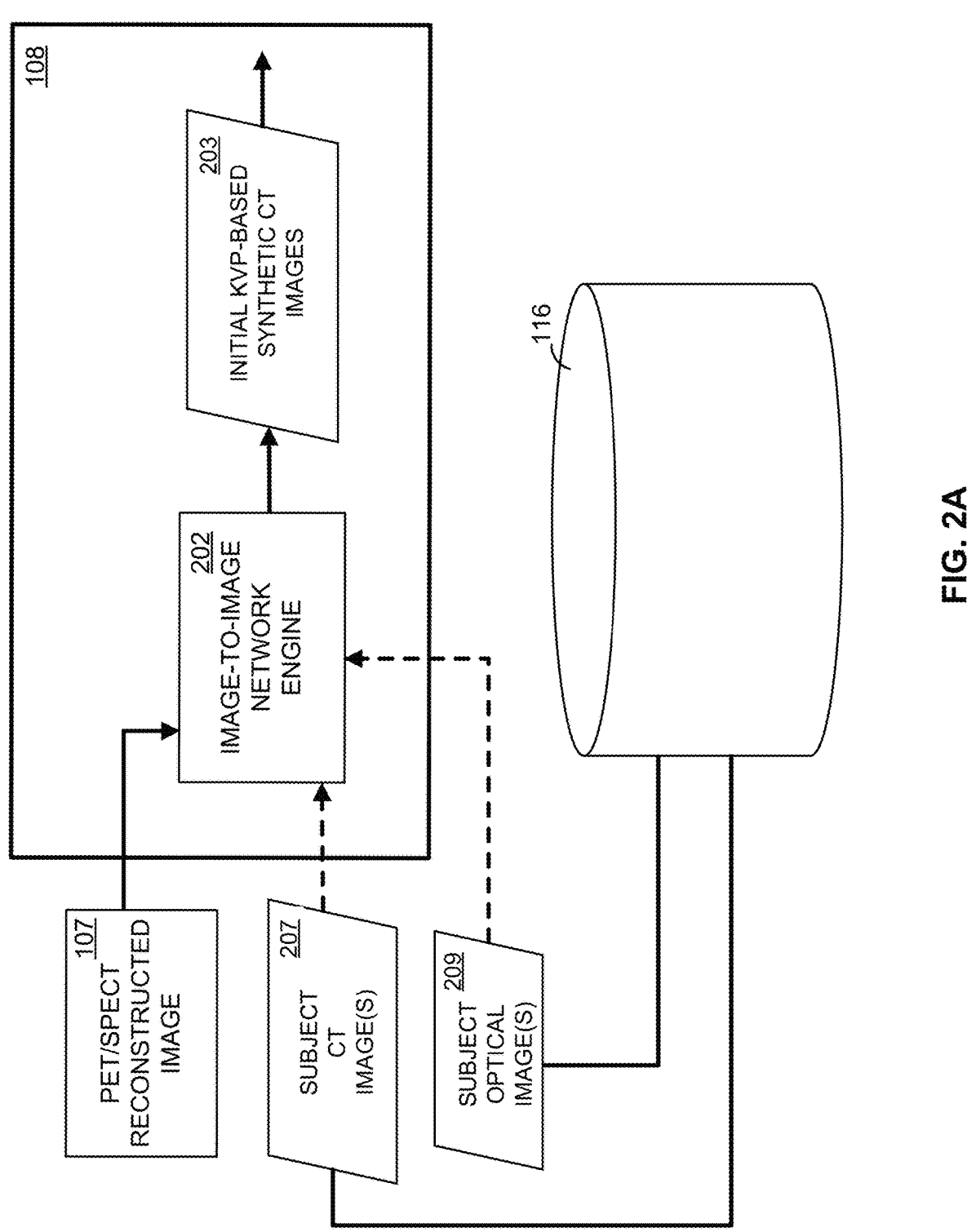
FIGS. 2A and 2B illustrate exemplary portions of the nuclear image reconstruction system of FIG. 1, in accordance with some embodiments.
Figure 2B:
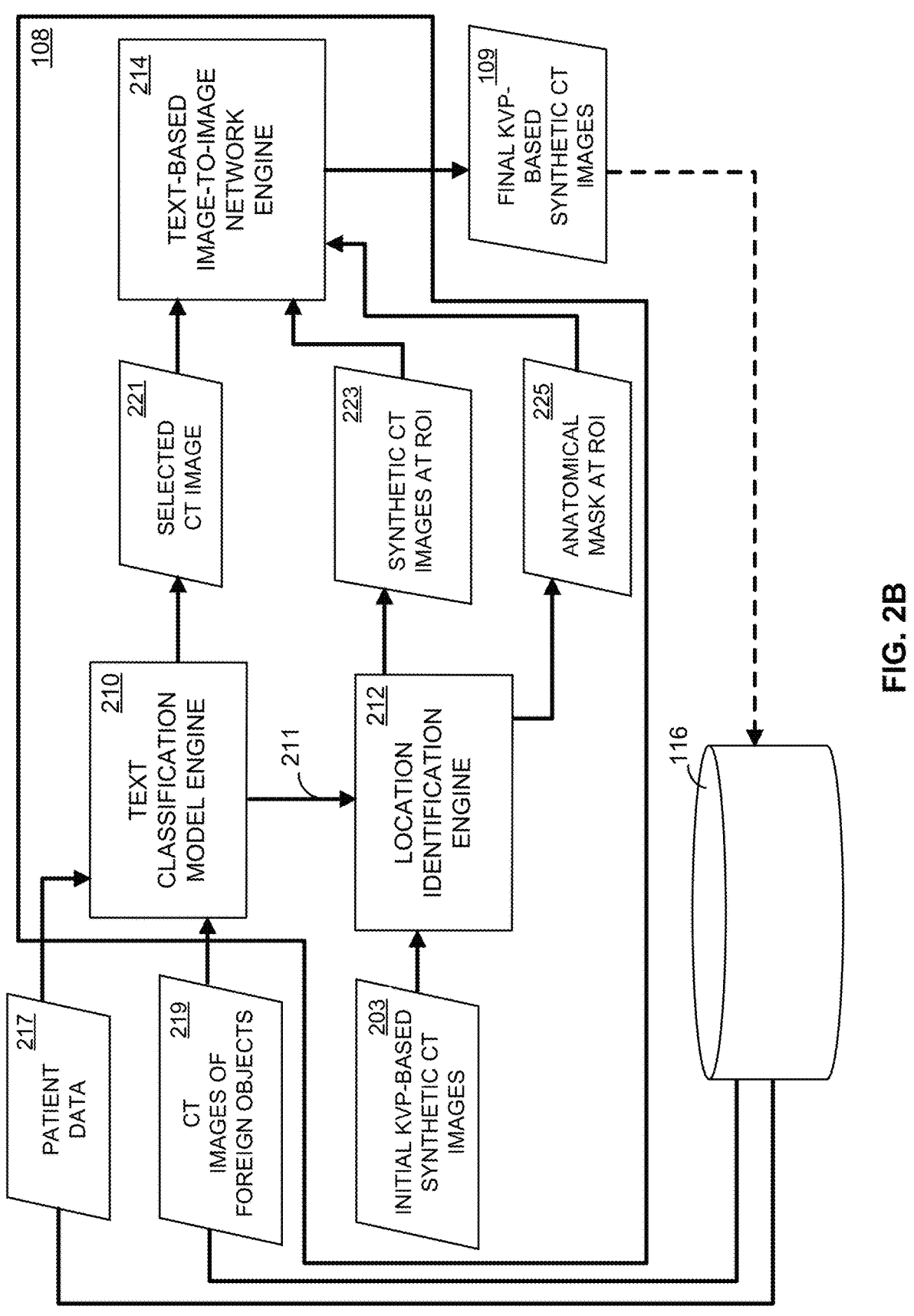

FIGS. 2A and 2B illustrate exemplary portions of the synthetic CT estimation engine 108 of the image reconstruction system 104. For example, and with reference to FIG. 2A, an image-to-image network engine 202 receives PET/SPECT reconstructed image 107, and, as described herein, applies a trained image-to-image network process to the PET/SPECT reconstructed image 107 to generate initial kVp-based synthetic images 203 at various imaging parameter values. Each of the initial kVp-based synthetic images 203 may be generated for a corresponding imaging parameter value (e.g., kVp level). The trained image-to-image network process may include generating features based on the PET/SPECT reconstructed image 107, inputting the features to a trained image-to-image network model, such as a trained neural network model, and receiving as output data the initial kVp-based synthetic images 203.

In some examples, the trained image-to-image network model includes one input channel, and a plurality (e.g., 7) of output channels. The input channel may receive the inputted features, while each output channel may provide an initial kVp-based synthetic image 203. For instance, a first output channel may provide a first initial kVp-based synthetic image 203 for an 80 kVp level, while a second output channel may provide a second initial kVp-based synthetic image 203 for a 90 kVp level. A third output channel may provide a third initial kVp-based synthetic image 203 for a 100 kVp level, and a fourth output channel may provide a fourth initial kVp-based synthetic image 203 for a 110 kVp level. Further, a fifth output channel may provide a fifth initial kVp-based synthetic image 203 for a 120 kVp level, a sixth output channel may provide sixth initial kVp-based synthetic image 203 for a 130 kVp level, and a seventh output channel may provide a seventh initial kVp-based synthetic image 203 for a 140 kVp level.

In some examples, image-to-image network engine 202 applies a trained image-to-image network process to the PET/SPECT reconstructed image 107 and one or more subject CT images 207 to generate the initial kVp-based synthetic images 203. For instance, the trained image-to-image network model may include two input channels, where PET/SPECT reconstructed image 107 features are provided to a first input channel. In addition, image-to-image network engine 202 may obtain one or more subject CT images 207. Each subject CT image 207 may include a partial CT image of the subject. For example, each subject CT image 207 may be based on a scan of a portion of the subject. Image-to-image network engine 202 may generate features based on the subject CT images 207, and may input the generated features to the second channel of the trained image-to-image network model to generate the initial kVp-based synthetic images 203.

In some instances, image-to-image network engine 202 obtains one or more subject optical images 209, which may include a partial optical image of the subject. Image-to-image network engine 202 may apply the trained image-to-image network process to the PET/SPECT reconstructed image 107 and the one or more subject optical images 209 to generate the initial kVp-based synthetic images 203.

In some examples, image-to-image network engine 202 applies a trained image-to-image network process to the PET/SPECT reconstructed image 107, at least one subject CT image 207, and at least one subject optical image 209 to generate the initial kVp-based synthetic images 203. For instance, image-to-image network engine 202 may generate features based on the PET/SPECT reconstructed image 107, at least one subject CT image 207, and at least one subject optical image 209, and may input the generated features to respective input channels (e.g., of a total of three input channels) of the trained image-to-image network process to generate, and output, the initial kVp-based synthetic images 203.

With reference to FIG. 2B, text classification model engine 210 receives, from data repository 116, patient data 217 and one or more CT images of foreign objects 219. As described herein, patient data 217 may characterize one or more objects within a subject. Text classification model engine 210 may apply a trained text classification process to the patient data to generate classification data that classifies the described object and, in some examples, a location of the object. In addition, and based on the classification, text classification model engine 210 may select, from data repository 116, a CT image of a foreign object, and provide the selected CT image 221. For example, text classification model engine 210 may compare the classification of the patient data 217 to labels of CT images of foreign objects 219 stored in data repository 116 and, based on the comparison, may select and provide a matching selected CT image 221. Text classification model engine 210 may transmit the selected CT image 221 to text-based image-to-image network engine 214. In addition, based on the classification, text classification model engine 210 may generate object classification data 211 characterizing the selected CT image 221. For example, the object classification data 211 may identify an anatomical name of the object within the selected CT image 221, or an identifier (I.D.) of the selected CT image 221. Text classification model engine 210 may transmit the object classification data 211 to location identification engine 212.

Based on the object classification data 211, location identification engine 212 may determine a region of interest (ROI) of each of the generated initial kVp-based synthetic images 203. For instance, location identification engine 212 may apply an anatomical segmented model to the object classification data 211 to determine the ROI. As described herein, the ROI may define an area of the subject that includes the object. Further, location identification engine 212 may generate synthetic CT images at ROI 223 that include a portion of each of the initial kVp-based synthetic images 203 based on the ROI. For example, location identification engine 212 may "crop" each of the initial kVp-based synthetic images 203 based on the ROI such that each synthetic CT image at ROI 223 includes portions of a corresponding initial kVp-based synthetic image 203 defined by the ROI (e.g., includes portions of the synthetic CT image at ROI 223 inside the ROI, and excludes portions of the synthetic CT image at ROI 223 outside the ROI).

Location identification engine 212 may also generate an anatomical mask for each of the portions of the initial synthetic CT images based on the ROI. For instance, location identification engine 212 may compute, from each initial kVp-based synthetic image 203, a corresponding anatomical mask. Location identification engine 212 may then crop the anatomical mask based on the ROI to generate anatomical mask at ROI 225.

Text-based image-to-image network engine 214 may receive the selected CT image 221, as well as the synthetic CT images at ROI 223 and corresponding anatomical masks at ROI 225, and may generate the final KVP-based synthetic CT images 109 based on the selected CT image 221, the synthetic CT images at ROI 223, and the anatomical masks at ROI 225. For example, text-based image-to-image network engine 214 may generate features based on the selected CT image 221, the synthetic CT images at ROI 223, and the anatomical masks at ROI 225, and may input the generated features to a trained image-to-image network model, such as a trained neural network model, to output the final KVP-based synthetic CT image 109. Text-based image-to-image network engine 214 may generate a final KVP-based synthetic CT image 109 for each of the initial kVp-based synthetic image 203. In some examples, text-based image-to-image network engine 214 may store the final KVP-based synthetic CT image 109 in data repository 116.

Figure 4:
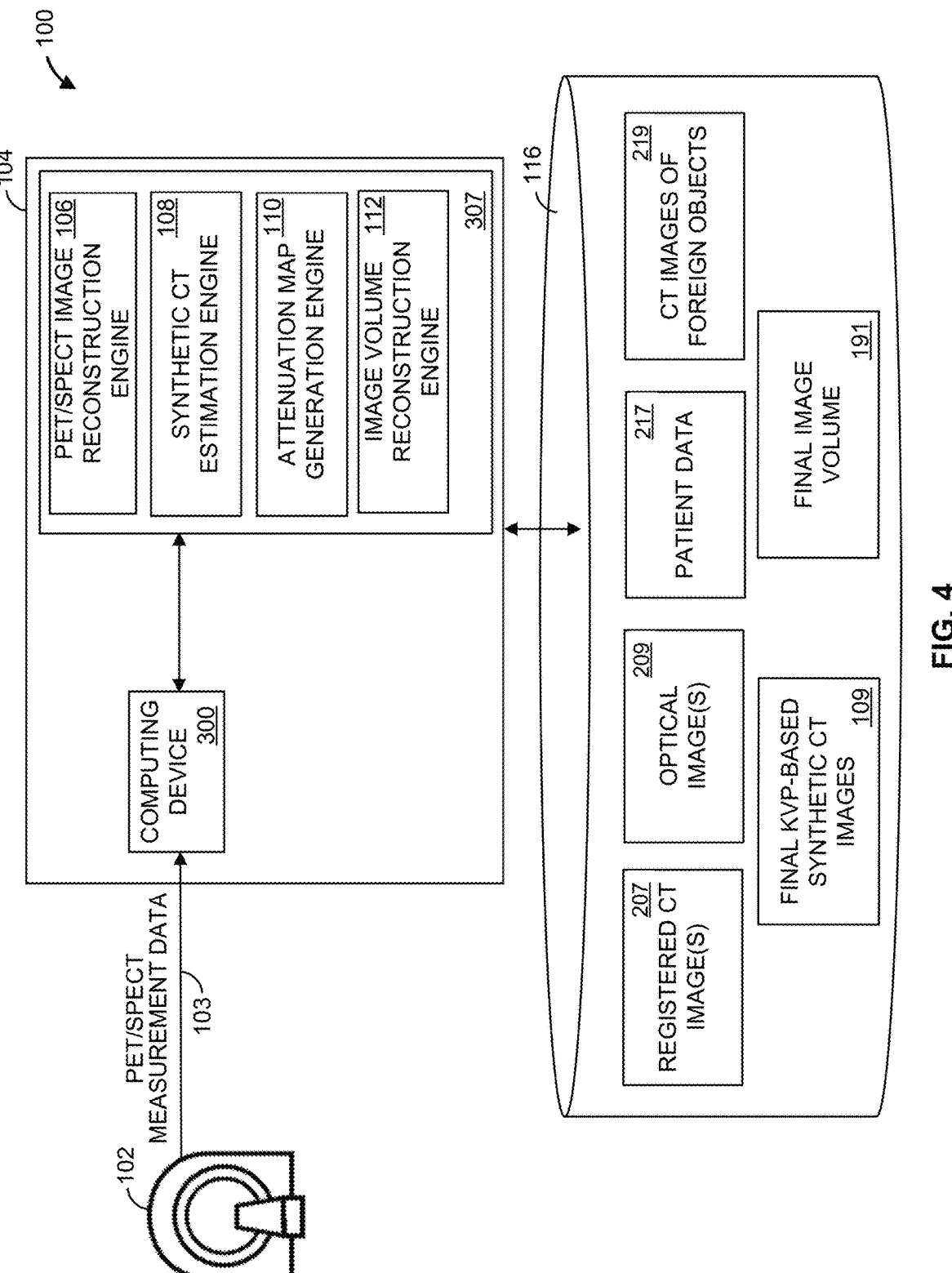
FIG. 4 illustrates exemplary portions of the nuclear image reconstruction system of FIG. 1, in accordance with some embodiments.

FIG. 4 illustrates exemplary portions of the nuclear imaging system 100. As illustrated, image reconstruction system 104 includes computing device 300 communicatively coupled to instruction memory 307. In this example, instruction memory 307 includes executable instructions for each of the PET/SPECT image reconstruction engine 106, synthetic CT estimation engine 108 (including one or more of the image-to-image network engine 202, text classification model engine 210, location identification engine 212, and text-based image-to-image network engine 214), attenuation map generation engine 110, and image volume reconstruction engine 112. Computing device 300 may receive from instruction memory 307 the executable instructions for one or more of the PET/SPECT image reconstruction engine 106, synthetic CT estimation engine 108, attenuation map generation engine 110, and image volume reconstruction engine 112, and may perform any of the operations described herein.

For example, based on the execution of the instructions for the PET/SPECT image reconstruction engine 106, computing device 300 may receive PET/SPECT measurement data 103 for a subject from the image scanning system 102, and may generate PET/SPECT reconstructed images 107 for various imaging parameter values. Further, and based on the execution of the instructions for the synthetic CT estimation engine 108, computing device 300 establishes a trained machine learning process (e.g., configures a trained machine learning model based on hyperparameters, weights, etc.), such as the trained image-to-image network processes described herein, and applies the trained machine learning processes to the reconstructed image 107 to generate final KVP-based synthetic CT images 109.

For instance, based on the execution of the instructions for the CT estimation engine 108, computing device 300 may apply a first trained image-to-image network process to the PET/SPECT reconstructed images 107 to generate initial kVp-based synthetic images, such as initial kVp-based synthetic images 203, for various imaging parameter values. In some examples, computing device 300 may execute the instructions for the CT estimation engine 108 to apply the first trained image-to-image network process to the PET/SPECT reconstructed images 107 and one or more of the subject CT images 207 and/or one or more of the optical images 209 to generate the initial kVp-based synthetic images.

Further, based on the execution of the instructions for the synthetic CT estimation engine 108, computing device 300 may apply a trained text classification process to patient data, such as patient data 217, for the subject to generate classification data that classifies a corresponding object (e.g., "implant") and, in some examples, a location of the object (e.g., "left hip"). In addition, based on the classification, computing device 300 may select, from the CT images of foreign objects 219 stored in data repository 116, a CT image, such as selected CT image 221. In addition, computing device 300 may execute the instructions for the synthetic CT estimation engine 108 to determine, based on the classification, a region of interest (ROI) of each of the generated initial kVp-based synthetic images. For instance, computing device 300 may execute an anatomical segmented model that operates on the classification to determine the ROI.

Further, computing device 300 may execute the instructions for the synthetic CT estimation engine 108 to determine a portion of each of the initial kVp-based synthetic images based on the ROI. As described herein, each portion may include the portions of the corresponding initial kVp-based synthetic image that maps to the ROI. Computing device 300 may also execute the instructions for the synthetic CT estimation engine 108 to generate an anatomical mask for each of the portions of the initial synthetic CT images based on the ROI.

Computing device 200 may also execute the instructions for the synthetic CT estimation engine 108 to apply a second trained image-to-image network process to the selected CT image, the portion of an initial kVp-based synthetic image, and the corresponding anatomical mask to generate a final KVP-based synthetic CT image, such as the final KVP-based synthetic CT images 109. Computing device 300 may generate a final KVP-based synthetic CT image for each initial kVp-based synthetic image. In some examples, computing device 300 stores the final KVP-based synthetic CT image 109 in data repository 116.

In addition, computing device 300 may execute the instructions for the attenuation map generation engine 110 to generate an attenuation map, such as an attenuation map 111, for each of the final KVP-based synthetic CT images 109.

For example, computing device 300 may apply a trained neural network process, such as a deep convolutional neural network process, to each final KVP-based synthetic CT image 109 to generate a corresponding initial attenuation map, and may determine a final attenuation map, such as final attenuation map 111, based on the initial attenuation maps. The final attenuation map may include pixel values that are based on averaging the corresponding pixel values of the initial attenuation maps, for instance.

Computing device 300 may further execute the instructions for the image volume reconstruction engine 112 to generate a final image volume, such as final image volume 191, based on the final attenuation map and the PET/SPECT measurement data 103. For example, computing device 300 may determine an adjustment of the PET/SPECT measurement data 103 based on the final attenuation map, and may generate the final image volume 191 based on the determined adjustments. In some examples, and based on the execution of the instructions for the image volume reconstruction engine 112, computing device 300 may store the final image volume 191 in data repository 116.

In some examples, and as described herein, computing device 300 executes instructions to train any of the machine learning processes described herein. For example, computing device 300 may execute instructions to train any of the first image-to-image network process, the second image-to-image network process, and the text classification process based on features generated from corresponding data. In some examples, the computing device 300 determines at least one metric based on the training, such as a loss function and/or an F1 score. If the at least one metric satisfies a corresponding threshold, the computing device 300 determines that training is complete. Otherwise, if the at least one metric does not satisfy the corresponding threshold, the computing device 300 continues to train the machine learning process based on features generated from additional corresponding data.

Figure 5:
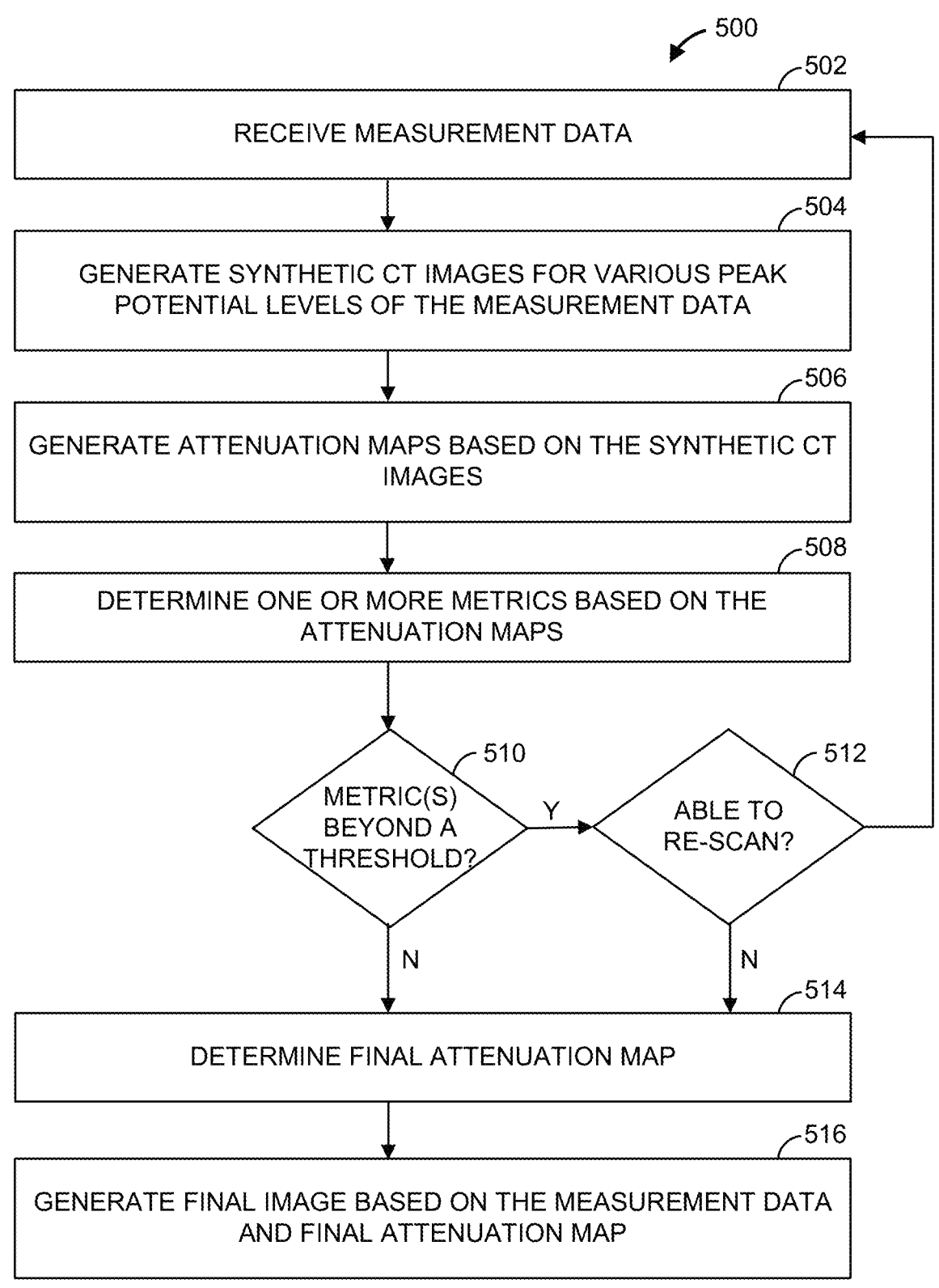
FIG. 5 is a flowchart of an example method to reconstruct an image, in accordance with some embodiments.

FIG. 5 is a flowchart of an example method 500 to reconstruct an image. The method can be performed by one or more computing devices, such as computing device 300, executing instructions, such as the instructions stored in instruction memory 307.

Beginning at block 502, measurement data, such as PET data or SPECT data, is received. For instance, computing device 300 may receive PET/SPECT measurement data 103 from the image scanning system 102. At block 504, synthetic CT images are generated for various values of an imaging parameter, such as peak potential levels of the received measurement data. For instance, and as described herein, computing device 300 may generate final kVp-based synthetic images based on the received measurement data (e.g., as described with respect to FIGS. 2A and 2B).

Further, at block 506, attenuation maps are generated based on the synthetic CT images. For instance, and as described herein, computing device 300 may generate an attenuation map for each of the synthetic CT images. At block 508, one or more metrics are generated based on the attenuation maps. For instance, computing device 300 may determine a mean, and a coefficient of variation, based on the attenuation maps. At block 510, a determination is made as to whether the one or more metrics are beyond a corresponding threshold. For instance, computing device 300 may determine wither the computed coefficient of variation is above a threshold. If the one or more metrics are beyond their corresponding thresholds, the method proceeds to block 512, where a determination is made as to whether the subject can be rescanned. If the subject can be re-scanned (e.g., an attending doctor provides an input to computing device 300 acknowledging to proceed with an additional scan), the method proceeds back to block 502, where the subject is re-scanned, and additional measurement data is received. If, however, the subject cannot be re-scanned (e.g., the attending doctor provides an input to computing device 300 denying the additional scan), the method proceeds to block 514.

Back at block 510, if the one or more metrics are not beyond their corresponding thresholds, the method also proceeds to block 514. At block 514, a final attenuation map is determined. For example, computing device 300 may perform any of the operations described herein to determine a final attenuation map based on the initial attenuation maps generated at block 506. For instance, computing device 300 may determine a mean of corresponding pixels of the initial attenuation maps to determine the final attenuation map. The method then proceeds to block 516, where a final image is generated based on the measurement data and the final attenuation map. For instance, and as described herein, computing device 300 may generate a final image volume 191 based on the PET/SPECT reconstructed image 107 and the final attenuation map 111.

FIG. 6 is a flowchart of an example method 600 to generate to generate synthetic CT images, such as final kVp-based synthetic CT images 109, and can be performed by one or more computing devices, such as computing device 300, executing instructions, such as the instructions stored in instruction memory 307.

Beginning at block 602, measurement data, such as PET data or SPECT data, is received for a patient. At block 604, a first image-to-image network process is applied to the measurement data to generate a plurality of initial synthetic CT images for a plurality of kVp levels. For instance, and as described herein, computing device 300 may apply a first trained image-to-image network process to PET/SPECT reconstructed image 107 to generate initial kVp-based synthetic CT images 203.

Proceeding to block 606, patient data is received. The patient data characterizes at least one object imaged with the patient, such as an object in the patient. For instance, the computing device 300 may obtain, from data repository 116, patient data 217 characterizing an object, such as an implant, in the patient. At block 608, a text classification process is applied to the patient data to determine a classification of the at least one object, and to select a CT image that includes the at least one object. For example, as described herein, computing device 300 may apply a text classification process to the patient data 217 and, based on the classification, computing device may determine a selected CT image 221 from the CT images of foreign objects 219 stored in data repository 116.

At block 610, a region-of-interest (ROI) of each of the plurality of synthetic CT images is determined based on the classification. For example, as described herein, computing device 300 may apply an anatomical segmented model to the classification of the at least one object (e.g., object classification data 211) to determine the ROI of each of the plurality of synthetic CT images. Further, at block 612, an anatomical mask for each of the plurality of synthetic CT images is generated based on the ROI. For instance, computing device 300 may compute, for each initial kVp-based synthetic image 203, a corresponding anatomical mask within ROI 225. In some examples, computing device 300 may compute, for each initial kVp-based synthetic image 203, a corresponding anatomical mask, and may crop the anatomical mask based on the ROI 225.

The method then proceeds to block 612, where a second image-to-image network process is applied to the patient data, the selected CT image, at least a portion of the plurality of synthetic CT images that includes the ROI, and the anatomical masks to generate a plurality of final synthetic CT images for the plurality of kVp levels. For instance, and as described herein, the computing device 300 may apply the second trained image-to-image network process to the selected CT image, the portion of an initial kVp-based synthetic image, and its corresponding anatomical mask to generate a final KVP-based synthetic CT image 109. The computing device 300 may perform these operations to generate a final synthetic CT image for each of the plurality of synthetic CT images.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method comprising:
   receiving measurement data for a patient from an image scanning system;
   applying a first image-to-image network process to the measurement data to generate a plurality of initial synthetic images, wherein each initial synthetic image of the plurality of synthetic images corresponds to a different one of a plurality of selected values of an imaging parameter;
   determining a region-of-interest (ROI) of the plurality of initial synthetic images based on patient data characterizing at least one object;
   generating a corresponding anatomical mask for each of the plurality of initial synthetic images based on the ROI;
   applying a second image-to-image network process to the patient data, at least a portion of the plurality of initial synthetic images that each include the ROI, and the corresponding anatomical mask to generate a final synthetic image for each of the plurality of values of the imaging parameter; and
   storing the plurality of final synthetic images in a data repository.

2. The computer-implemented method of claim 1 further comprising:
   determining, based on the patient data, an image of the at least one object; and
   determining the ROI of each initial synthetic image of the plurality of initial synthetic images based on the image of the at least one object.

3. The computer-implemented method of claim 2 further comprising applying the second image-to-image network process to the image of the at least one object to generate the plurality of final synthetic images.

4. The computer-implemented method of claim 2 comprising:
   applying a text classification process to the patient data to determine a classification of the at least one object; and
   determining the image of the at least one object based on the classification.

5. The computer-implemented method of claim 1 comprising:

generating an attenuation map of each of the plurality of final synthetic images; and generating a final image based on the measurement data and the attenuation map of each of the plurality of final synthetic images.

6. The computer-implemented method of claim 5, comprising:

determining a final attenuation map based on the attenuation map of each of the plurality of final synthetic images; and generating the final image based on the final attenuation map.

7. The computer-implemented method of claim 6, wherein determining the final attenuation map comprises determining a mean of the attenuation maps of the plurality of final synthetic images.

8. The computer-implemented method of claim 6, comprising displaying the final image.

9. The computer-implemented method of claim 5 comprising:

determining a coefficient of variation based on the attenuation maps of the plurality of final synthetic images;

determining that the coefficient of variation satisfies a threshold; and generating the final image in response to determining that the coefficient of variation satisfies the threshold.

10. The computer-implemented method of claim 1, wherein applying the second image-to-image network process comprises:

generating features based on the patient data, the portion of the plurality of initial synthetic images, and the anatomical masks; and inputting the features to a trained neural network to generate output data characterizing the plurality of final synthetic images.

11. The computer-implemented method of claim 1, wherein the measurement data is positron emission tomography (PET) data.

12. The computer-implemented method of claim 1, wherein the measurement data is single-photon emission computed tomography (SPECT) data.

13. A non-transitory computer readable medium storing instructions that, when executed by at least one processor, cause the at least one processor to perform operations comprising:

receiving measurement data for a patient from an image scanning system;

applying a first image-to-image network process to the measurement data to generate a plurality of initial synthetic images, wherein each initial synthetic image of the plurality of synthetic images corresponds to a different one of a plurality of selected values of an imaging parameter;

determining a region-of-interest (ROI) of the plurality of initial synthetic images based on patient data characterizing at least one object;

generating a corresponding anatomical mask for each of the plurality of initial synthetic images based on the ROI;

applying a second image-to-image network process to the patient data, at least a portion of the plurality of initial synthetic images that each include the ROI, and the corresponding anatomical mask to generate a final synthetic image for each of the plurality of values of the imaging parameter; and storing the plurality of final synthetic images in a data repository.

14. The non-transitory computer readable medium of claim 13 storing instructions that, when executed by the at least one processor, further cause the at least one processor to perform operations comprising:

determining, based on the patient data, an image of the at least one object; and determining the ROI of each initial synthetic image of the plurality of initial synthetic images based on the image of the at least one object.

15. The non-transitory computer readable medium of claim 14 storing instructions that, when executed by the at least one processor, further cause the at least one processor to perform operations comprising applying the second image-to-image network process to the image of the at least one object to generate the plurality of final synthetic images.

16. The non-transitory computer readable medium of claim 14 storing instructions that, when executed by the at least one processor, further cause the at least one processor to perform operations comprising:

applying a text classification process to the patient data to determine a classification of the at least one object; and determining the image of the at least one object based on the classification.

17. The non-transitory computer readable medium of claim 13 storing instructions that, when executed by the at least one processor, further cause the at least one processor to perform operations comprising:

generating an attenuation map of each of the plurality of final synthetic images; and generating a final image based on the measurement data and the attenuation map of each of the plurality of final synthetic images.

18. The non-transitory computer readable medium of claim 17 storing instructions that, when executed by the at least one processor, further cause the at least one processor to perform operations comprising:

determining a final attenuation map based on the attenuation map of each of the plurality of final synthetic images; and generating the final image based on the final attenuation map.

19. The non-transitory computer readable medium of claim 18 wherein determining the final attenuation map comprises determining a mean of the attenuation maps of the plurality of final synthetic images.

20. A system comprising:

a database; and at least one processor communicatively coupled to the database and configured to:

receive measurement data for a patient from an image scanning system;

apply a first image-to-image network process to the measurement data to generate a plurality of initial synthetic images, wherein each initial synthetic image of the plurality of synthetic images corresponds to a different one of a plurality of selected values of an imaging parameter;

determine a region-of-interest (ROI) of the plurality of initial synthetic images based on patient data characterizing at least one object;

generate a corresponding anatomical mask for each of the plurality of initial synthetic images based on the ROI;

apply a second image-to-image network process to the patient data, at least a portion of the plurality of initial synthetic images that each include the ROI, and the corresponding anatomical mask to generate a final synthetic image for each of the plurality of values of the imaging parameter; and store the plurality of final synthetic images in a data repository.

\* \* \* \* \*